(12) United States Patent
Yang et al.

(10) Patent No.: US 10,521,921 B2
(45) Date of Patent: Dec. 31, 2019

(54) IMAGE CAPTURING APPARATUS, SYSTEM AND METHOD

(71) Applicants: STMicroelectronics (Research & Development) Limited, Marlow (GB); STMicroelectronics, Inc., Coppell, TX (US)

(72) Inventors: Xiaoyong Yang, San Jose, CA (US); Neale Dutton, Edinburgh (GB)

(73) Assignees: STMICROELECTRONICS (RESEARCH & DEVELOPMENT) LIMITED, Marlow (GB); STMICROELECTRONICS, INC., Coppell, TX (US)

( * ) Notice: Subject to any disclaimer, the term of this patent is extended or adjusted under 35 U.S.C. 154(b) by 127 days.

(21) Appl. No.: 15/476,100

(22) Filed: Mar. 31, 2017

(65) Prior Publication Data

US 2018/0089848 A1 Mar. 29, 2018

(30) Foreign Application Priority Data

Sep. 28, 2016 (EP) ..................................... 16191039

(51) Int. Cl.
*G01S 17/89* (2006.01)
*G06T 7/55* (2017.01)
*G06T 7/73* (2017.01)
*G06T 7/521* (2017.01)
*H04N 5/235* (2006.01)
(Continued)

(52) U.S. Cl.
CPC .................. *G06T 7/55* (2017.01); *G01S 7/48* (2013.01); *G01S 7/4802* (2013.01); *G01S 7/497* (2013.01); *G01S 17/023* (2013.01); *G01S 17/026* (2013.01); *G01S 17/89* (2013.01); *G06K 9/00255* (2013.01); *G06T 7/521* (2017.01); *G06T 7/74* (2017.01); *H04N 5/2354* (2013.01);
(Continued)

(58) Field of Classification Search
None
See application file for complete search history.

(56) References Cited

U.S. PATENT DOCUMENTS 8,908,157 B2 * 12/2014 Eisele ...................... G01C 3/08
356/5.01
2014/0153816 A1 6/2014 Cohen et al.
(Continued)

FOREIGN PATENT DOCUMENTS

EP 1 241 634 A2 9/2002
EP 2 602 640 A1 6/2013
(Continued)

*Primary Examiner* — Christopher G Findley
(74) *Attorney, Agent, or Firm* — Seed IP Law Group LLP

(57) ABSTRACT

An apparatus includes time of flight single-photon avalanche diode (ToF SPAD) circuitry. The ToF SPAD circuitry generates indications of distance between the apparatus and an object within a field of view. A processor receives the indications of distance and controls at least one image sensor, such as a camera, to capture at least one image based on at least one indication of distance. The processor determines whether an image is a true representation of an expected object by comparing multiple indications of distance associated with the object to an expected object distance profile and comparing the image to at least one expected object image.

19 Claims, 13 Drawing Sheets

(51) Int. Cl.
*G01S 17/02* (2006.01)
*G01S 7/48* (2006.01)
*G01S 7/497* (2006.01)
*G06K 9/00* (2006.01)
*G07C 9/00* (2006.01)

(52) U.S. Cl.
CPC .............. *G06T 2207/10028* (2013.01); *G07C 9/00158* (2013.01)

(56) References Cited

U.S. PATENT DOCUMENTS

| 2015/0285625 A1* | 10/2015 | Deane | G01S 17/10 348/140 |
| 2016/0041266 A1* | 2/2016 | Smits | G01S 17/66 356/5.01 |
| 2016/0291138 A1* | 10/2016 | Drader | G01S 7/4863 |
| 2016/0327639 A1* | 11/2016 | Albert | F16P 3/144 |
| 2016/0327649 A1* | 11/2016 | Albert | F16P 3/14 |

FOREIGN PATENT DOCUMENTS

| GB | 2485997 A | 6/2012 |
| WO | 03/034361 A1 | 4/2003 |

* cited by examiner

IMAGE CAPTURING APPARATUS, SYSTEM AND METHOD

BACKGROUND

Technical Field

This disclosure relates to an apparatus and in particular but not exclusively to an apparatus with an array of photosensitive devices.

Description of the Related Art

The use of cameras as networked sensors or networked devices is known. Cameras for example may be used as sensors within many applications. For example a camera or cameras may be used in sensors implemented within the internet of things (IOT) to monitor activity for controlling household devices, in industrial processes for verification of objects and in security for biometric authentication.

A specific example may be the use of a camera (or multiple cameras) employed as a security sensor for capturing images. The security sensor may be used to control access to an area based on whether the image biometrically identifies the person in front of the camera.

Such uses of cameras as sensors however has several issues. Firstly the camera is typically operated in an always on mode which is a high power consumption mode.

Secondly a single camera may be unable to determine whether the image captured is actually an image of a real object or an image of an image of the object. Thus a printed image of an authorized person may be used to spoof a camera that the authorized person is present and open a controlled door or gate.

Thirdly capturing of images for security purposes can produce poor results where there is any transparent surface between the camera and the object being imaged. For example when a person is located behind a pane of glass the camera on the other side may not be able to capture an in-focus image to identify the person. Similarly a pair of glasses may prevent a good quality image of the person's iris from being captured.

One known solution to these problems is to employ devices having multiple cameras to determine a distance between the cameras and the object. Computational camera applications may compare features within the images captured by the cameras and use the knowledge of intrinsic and extrinsic parameters associated with the cameras or camera arrays to determine the distance from the device. Computational camera applications thus can create 3D images with associated 3D depth maps which may then be used to assist focusing and foreground-background separation.

Accuracy, speed and consistency of the depth computation may be important for the use cases described above. For instance, the device should generate consistent 3D models, which can be used to determine whether the image is in focus or is a 'proper' image. Errors in the 3D models can for example lead to incorrect results.

Furthermore limitations in cameras, algorithms and device production prevent effective correction of all errors, motions and variations. These issues are typically worse in mobile devices because of the limited computation power, battery capacity and movement of the device during capture.

BRIEF SUMMARY

In an embodiment, an apparatus comprises: at least one time of flight (ToF) single-photon avalanche diode (SPAD) based range detecting module or circuit, configured to generate at least one distance determination between the apparatus and an object within a module field of view; and a processor configured to receive the at least one distance determination from the ToF SPAD based range detecting module and control at least one camera configured to capture at least one image based on the at least one distance determination.

In an embodiment, the ToF SPAD based range detecting module may comprise the processor.

In an embodiment, the processor may be configured to: determine the at least one object is within a field of view of the at least one camera based on the at least one distance determination; and control the at least one camera to capture the at least one image based on the determination of the at least one object being within the field of view of the at least one camera, the at least one image comprising a representation of the object.

In an embodiment, the processor may be configured to control at least one illumination source based the determination of the at least one object being within the field of view of the at least one camera based on the at least one distance determination.

In an embodiment, the at least one time of flight (ToF) single-photon avalanche diode (SPAD) based range detecting module may be configured to generate multiple distance determinations between the apparatus and the object, each distance determination representing a region within the module field of view.

In an embodiment, the processor may be configured to verify the at least one image comprises a true representation of an expected object by: comparing the distance determinations against an expected object distance profile; and comparing the at least one image against at least one expected object image.

In an embodiment, the processor may be configured to control at least one security function based on the processor positively verifying the at least one image comprises a true representation of an expected object by:

matching the distance determinations with the expected object distance profile; and matching the at least one image with the at least one expected object image.

In an embodiment, the at least one time of flight (ToF) single-photon avalanche diode (SPAD) based range detecting module may be configured to generate multiple range distance determinations between the apparatus and the object for a single region within the module field of view, and the processor may be configured to control an alert system based on determining a translucent/transparent object between the at least one camera and the object.

In an embodiment, the ToF SPAD based range detecting module may be configured to directly provide the at least one distance determination to the at least one camera to set the focal distance of the at least one camera.

In an embodiment, the at least one camera may comprise at least two cameras, wherein each of the at least two cameras comprise at least a partially overlapping field of view with a field of view of the ToF SPAD based range detecting module, wherein the at least one processor may be configured to: receive images from each of the at least two cameras, the images comprising a representation of the object; determine at least one camera derived distance determination between the at least two cameras and the object based on comparing the differences in the images from each of the cameras and parameters defining the at least two cameras; and verify the at least one camera derived distance determination using the at least one distance determination from the ToF SPAD based range detecting module.

In an embodiment, a method comprises: generating, using at least one time of flight (ToF) single-photon avalanche diode (SPAD) based range detecting module or circuit, at least one distance determination between the module and an object within a module field of view; receiving the at least one distance determination at a processor; and controlling, by the processor, at least one camera to capture at least one image based on the at least one distance determination.

In an embodiment, the method may comprise: determining by the processor the at least one object is within a field of view of the at least one camera module based on the at least one distance determination; and controlling the at least one camera to capture the at least one image based on the determination of the at least one object being within the field of view of the at least one camera, the at least one image comprising a representation of the object.

In an embodiment, the method may comprise: controlling, by the processor, at least one illumination source based the determination of the at least one object being within the field of view of the at least one camera based on the at least one distance determination.

In an embodiment, generating at least one distance determination may comprise generating multiple distance determinations between the module and the object, each distance determination representing a separate region within the module field of view.

In an embodiment, the method may comprise verifying the at least one image comprises a true representation of an expected object by: comparing the multiple distance determinations against an expected object distance profile; and comparing the at least one image against at least one expected object image.

In an embodiment, the method may comprise controlling at least one security function based on positively verifying the at least one image comprises a true representation of an expected object by: matching the distance determinations with the expected object distance profile; and matching the at least one image with the at least one expected object image.

In an embodiment, generating at least one distance determination may comprise generating multiple range distance determinations between the module and the object for a single region within the module field of view.

In an embodiment, the method may comprise controlling an alert/information system based on determining a translucent/transparent object between the module and the object.

In an embodiment, the method may comprise directly providing the at least one distance determination to the at least one camera to set the focal distance of the at least one camera.

In an embodiment, the method may comprise providing at least two cameras, wherein each of the at least two cameras comprise at least a partially overlapping field of view with the module field of view, wherein the method may comprise: receiving images from each of the at least two camera modules, the images comprising a representation of the object; determining at least one camera derived distance determination between the at least two cameras and the object based on comparing the differences in the images from each of the cameras and parameters defining the at least two cameras; and verifying the at least one camera derived distance determination using the at least one distance determination from the ToF SPAD based range detecting module.

In an embodiment, an apparatus comprises: at least one time of flight single-photon avalanche diode (ToF SPAD), which, in operation, generates at least one indication of a distance between the apparatus and an object within a field of view of the apparatus; and processing circuitry, which, in operation, controls at least one image sensor to capture at least one image based on the at least one indication of the distance between the apparatus and the object in the field of view of the apparatus. In an embodiment, the processing circuitry, in operation: determines whether the at least one object is within a field of view of the at least one image sensor based on the at least one indication of the distance; and controls the at least one image sensor to capture the at least one image based on the determination of whether the at least one object is within the field of view of the at least one image sensor, the at least one image comprising a representation of the object. In an embodiment, the processing circuitry, in operation, controls at least one illumination circuit based the determination of whether the at least one object is within the field of view of the at least one image sensor. In an embodiment, the at least one ToF SPAD, in operation, generates multiple indications of distance between the apparatus and the object, each of the multiple indications of distance corresponding to a region within the field of view of the apparatus. In an embodiment, the processing circuitry, in operation, verifies the at least one image comprises a true representation of an expected object, the verifying including: comparing the multiple indications of distance to an expected object distance profile; and comparing the at least one image to at least one expected object image. In an embodiment, the processing circuitry, in operation: controls at least one security function based on the verifying. In an embodiment, the at least one ToF SPAD, in operation, generates multiple indications of distance between the apparatus and the object for a single region within the field of view, and the processing circuitry, in operation: determines whether a translucent or transparent object is between the at least one image sensor and the object in the field of view of the apparatus; and controls an alert system based on determining whether a translucent/transparent object is between the at least one image sensor and the object in the field of view of the apparatus. In an embodiment, the at least one ToF SPAD, in operation, provides the at least one indication of distance to the at least one image sensor to set a focal distance of the at least one image sensor. In an embodiment, the at least one image sensor comprises at least two image sensors, the at least two image sensors having at least a partially overlapping field of view with a field of view of the ToF SPAD; and the processing circuitry, in operation: receives images from each of the at least two image sensors, the images comprising a representation of the object; determines at least one indication of distance between the at least two image sensors and the object in the field of view of the apparatus based on the images from each of the image sensors and parameters of the at least two image sensors; and verifies the at least one indication of distance between the at least two image sensors and the object based on the at least one indication of distance between the apparatus and the object in the field of view of the apparatus. In an embodiment, the at least one image sensor comprises at least one camera.

In an embodiment, a method comprises: generating, using at least one time of flight single-photon avalanche diode (ToF SPAD), at least one indication of a distance between the at least one ToF SPAD and an object within a field of view of the at least one ToF SPAD; and controlling, using processing circuitry, at least one image sensor to capture at least one image based on the at least one indication of a distance between the at least one ToF SPAD and the field of view of the ToF SPAD. In an embodiment, the method comprises: determining by the processing circuitry, whether the at least one object is within a field of view of the at least one image sensor based on the at least one indication of the distance; and controlling, by the processing circuitry, the at least one image sensor to capture the at least one image based on the determination of whether the at least one object is within the field of view of the at least one image sensor, the at least one image comprising a representation of the object. In an embodiment, the method comprises: controlling, by the processing circuitry, at least one illumination circuit based the determination of whether the at least one object is within the field of view of the at least one image sensor. In an embodiment, the generating at least one indication of distance comprises generating multiple indications of distance between the at least one ToF SPAD and the object, each of the multiple indications of distance representing a separate region within the field of view of the at least one ToF SPAD. In an embodiment, the method comprises verifying the at least one image comprises a true representation of an expected object by: comparing the multiple indications of distance to an expected object distance profile; and comparing the at least one image to at least one expected object image. In an embodiment, the method comprising controlling at least one security function based on the verifying.

In an embodiment, a system comprises: image sensing circuitry, which, in operation, captures images of objects; time of flight single-photon avalanche diode (ToF SPAD) circuitry, which, in operation, generates indications of distance associated with objects within a field of view; and processing circuitry, which, in operation, controls capturing of images by the image sensing circuitry based on indications of distance associated with objects generated by the ToF SPAD circuitry. In an embodiment, the system comprises illumination circuitry and the processing circuitry, in operation, controls the illumination circuitry based on indications of distance associated with objects generated by the ToF SPAD circuitry. In an embodiment, the system comprises an integrated circuit, the integrated circuit including at least the ToF SPAD circuitry and the image sensing circuitry. In an embodiment, the image sensing circuitry comprises at least two image sensors, the at least two image sensors having at least a partially overlapping field of view with a field of view of the ToF SPAD circuitry. In an embodiment, the system comprises smart phone circuitry.

In an embodiment, an apparatus comprises: time of flight single-photon avalanche diode (ToF SPAD) circuitry, which, in operation, generates multiple indications of distance between the apparatus and an object within a field of view of the apparatus, wherein the multiple indications of distance corresponding to respective regions within the field of view of the apparatus; and processing circuitry, which, in operation, controls at least one image sensor to capture at least one image based on at least one of the multiple indications of distance between the apparatus and the object in the field of view of the apparatus; and determines whether the at least one image comprises a true representation of an expected object, the determining including: comparing the multiple indications of distance to an expected object distance profile; and comparing the at least one image to at least one expected object image. In an embodiment, the processing circuitry, in operation: determines whether the at least one object is within a field of view of the at least one image sensor based on at least one of the multiple indications of distance; and controls the at least one image sensor to capture the at least one image based on the determination of whether the at least one object is within the field of view of the at least one image sensor, the at least one image comprising a representation of the object. In an embodiment, the processing circuitry, in operation, controls at least one illumination circuit based the determination of whether the at least one object is within the field of view of the at least one image sensor. In an embodiment, the processing circuitry, in operation: controls at least one security function based on the determination of whether the at least one image comprises a true representation of an expected object. In an embodiment, the ToF SPAD circuitry, in operation, generates multiple indications of distance between the apparatus and the object for a single region within the field of view, and the processing circuitry, in operation: determines whether a translucent or transparent object is between the at least one image sensor and the object in the field of view of the apparatus; and controls an alert system based on the determining whether a translucent/transparent object is between the at least one image sensor and the object in the field of view of the apparatus. In an embodiment, the ToF SPAD circuitry, in operation, provides at least one of the multiple indications of distance to the at least one image sensor to set a focal distance of the at least one image sensor. In an embodiment, the at least one image sensor comprises at least two image sensors, the at least two image sensors having at least a partially overlapping field of view with a field of view of the ToF SPAD circuitry; and the processing circuitry, in operation: receives images from each of the at least two image sensors, the images comprising a representation of the object; determines at least one indication of distance between the at least two image sensors and the object in the field of view of the apparatus based on the images from each of the image sensors and parameters of the at least two image sensors; and verifies the at least one indication of distance between the at least two image sensors and the object based on at least one of the multiple indications of distance between the apparatus and the object in the field of view of the apparatus. In an embodiment, the at least one image sensor comprises at least one camera.

In an embodiment, a method comprises: generating, using time of flight single-photon avalanche diode (ToF SPAD) circuitry, multiple indications of distance between the ToF SPAD circuitry and an object within a field of view of the ToF SPAD circuitry, the multiple indications of distance corresponding to respective regions within the field of view of the ToF SPAD circuitry; controlling, using processing circuitry, at least one image sensor to capture at least one image based on at least one of the multiple indications of distance between the ToF SPAD circuitry and the field of view of the ToF SPAD circuitry; and determining, using the processing circuitry, whether the at least one image comprises a true representation of an expected object, the determining including: comparing the multiple indications of distance to an expected object distance profile; and comparing the at least one image to at least one expected object image. In an embodiment, the method comprises: determining by the processing circuitry, whether the at least one object is within a field of view of the at least one image sensor based on at least one of the multiple indications of distance; and controlling, by the processing circuitry, the at least one image sensor to capture the at least one image based on the determination of whether the at least one object is within the field of view of the at least one image sensor, the at least one image comprising a representation of the object. In an embodiment, the method comprises: controlling, by the processing circuitry, at least one illumination circuit based the determination of whether the at least one object is within the field of view of the at least one image sensor. In an embodiment, the method comprises controlling at least one security function based on the determination of whether the at least one image comprises a true representation of an expected object. In an embodiment, the method comprises providing at least one of the multiple indications of distance to the at least one image sensor to set a focal distance of the at least one image sensor. In an embodiment, the at least one image sensor comprises at least two image sensors, the at least two image sensors having at least a partially overlapping field of view with a field of view of the ToF SPAD circuitry, and the method comprises: controlling, using the processing circuitry, the at least two image sensors to capture respective images comprising a representation of the object; determining, using the processor, at least one indication of distance between the at least two image sensors and the object in the field of view based on the images from each of the at least two image sensors and parameters of the at least two image sensors; and verifying the at least one indication of distance between the at least two image sensors and the object based on at least one of the multiple indications of distance between the apparatus and the object in the field of view of the apparatus. In an embodiment, the at least one image sensor comprises at least one camera.

In an embodiment, a system comprises: image sensing circuitry, which, in operation, captures images of objects; time of flight single-photon avalanche diode (ToF SPAD) circuitry, which, in operation, generates indications of distance associated with objects within a field of view, the indications of distance corresponding to respective regions within the field of view; and processing circuitry, which, in operation: controls capturing of images by the image sensing circuitry based on indications of distance associated with objects generated by the ToF SPAD circuitry; and determines whether an image comprises a true representation of an expected object, the determining including: comparing multiple indications of distance associated with the object to an expected object distance profile; and comparing the image to at least one expected object image.

In an embodiment, the system comprises illumination circuitry, and the processing circuitry, in operation, controls the illumination circuitry based on indications of distance associated with objects generated by the ToF SPAD circuitry. In an embodiment, the system comprises an integrated circuit, the integrated circuit including at least the ToF SPAD circuitry and the image sensing circuitry. In an embodiment, the image sensing circuitry comprises at least two image sensors, the at least two image sensors having at least a partially overlapping field of view with a field of view of the ToF SPAD circuitry. In an embodiment, the system comprises smart phone circuitry.

BRIEF DESCRIPTION OF THE SEVERAL VIEWS OF THE DRAWINGS

Some embodiments will now be described by way of example only and with reference to the accompanying Figures in which.

DETAILED DESCRIPTION

In an embodiment, a single-photon avalanche diode (SPAD) time-of-flight (ToF) sensor is employed to assist a processor unit or circuit in sensor applications employing cameras. This assistance may, for example, be at least one of: an auxiliary presence detector; an auxiliary multi-zone presence detector; an auxiliary multi-range presence detector; an auxiliary focus distance detector; and an object shape verifier.

Figure 1:
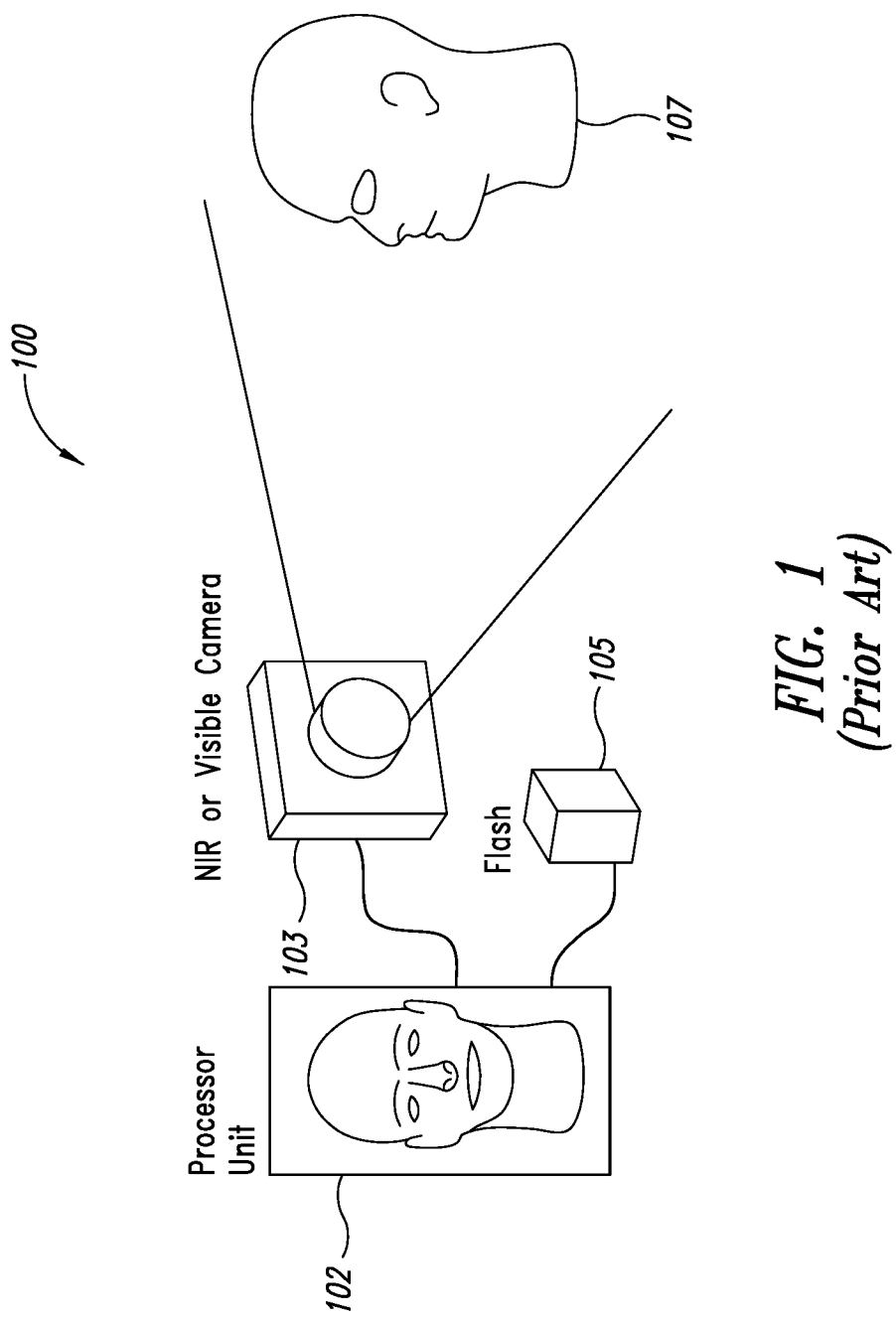
FIG. 1 shows a schematic view of an example known security implementation apparatus.

In order to aid understanding of the embodiments described herein we first describe a typical camera security system. FIG. 1 shows a camera employed as part of a security implementation system. The system 100 comprises a near infrared, infrared, or visible camera 103 which is configured to capture an image of an object 107, for example a person shown in FIG. 1 as the 'head', and output the image to a processor unit or circuitry 102. Furthermore the system may comprise a flash 105 or illumination source which is coupled to the processor unit 102 and furthermore is configured to generate illumination for the object 107. The flash 105 may be a visible light, infra-red, near infra-red, or near ultra-violet illumination source.

The system 100 may further comprise the processor unit 102 which may control the camera 103 and flash 105 in order to generate illumination to enable the camera to operate even in poor light conditions. As discussed previously such a system has problems such as power consumption (for example requiring the flash 105 and camera 103 to be operated in an always on mode), security issues (for example spoofing the processor unit 102 to detecting a 'known' face when actually it is a photograph of the 'face', and quality issues (for example failing to recognize or detect features which are behind a transparent or glass screen).

Figure 2:
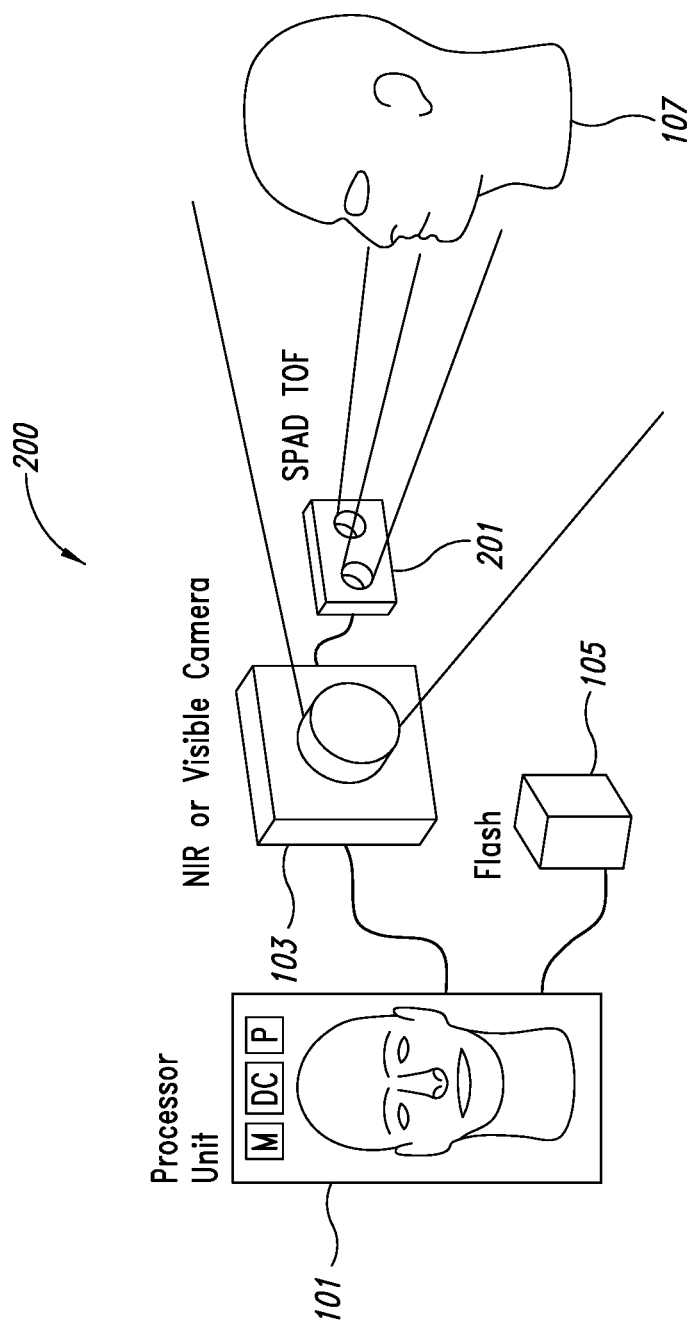
FIG. 2 shows a schematic view of an example security implementation apparatus according to some embodiments.

FIG. 2 shows a schematic view of an example camera security system 200 according to some embodiments. The system 200 comprises a camera 103 and flash 105 coupled to a processor unit or circuitry 101. As illustrated, the processing unit or circuitry 101 comprises one or more processing cores P, one or more memories M and one or more discrete circuits DC, which, in operation, perform one or more of the functions disclosed herein, such as functions of one or more of the modules or circuits disclosed herein (see, e.g., the target detector 301 and camera/flash controller 303 of FIG. 3A). Furthermore the system 200 comprises one or more single-photon avalanche devices (SPAD) time of flight (TOF) modules or circuits 201 coupled to the processor 101 and/or to the camera 103. The example shown in FIG. 2 shows a SPAD TOF module 201 coupled to the camera 103 and via the camera 103 to the processor unit 101. In some embodiments the SPAD TOF module 201 is coupled directly to the processor unit 101. In some embodiments the processor unit 101 is implemented at least partially within the SPAD TOF module. In such embodiments the operations performed by the processor unit 101 as described hereafter may be performed at least partially within the SPAD TOF module.

Figure 3A:
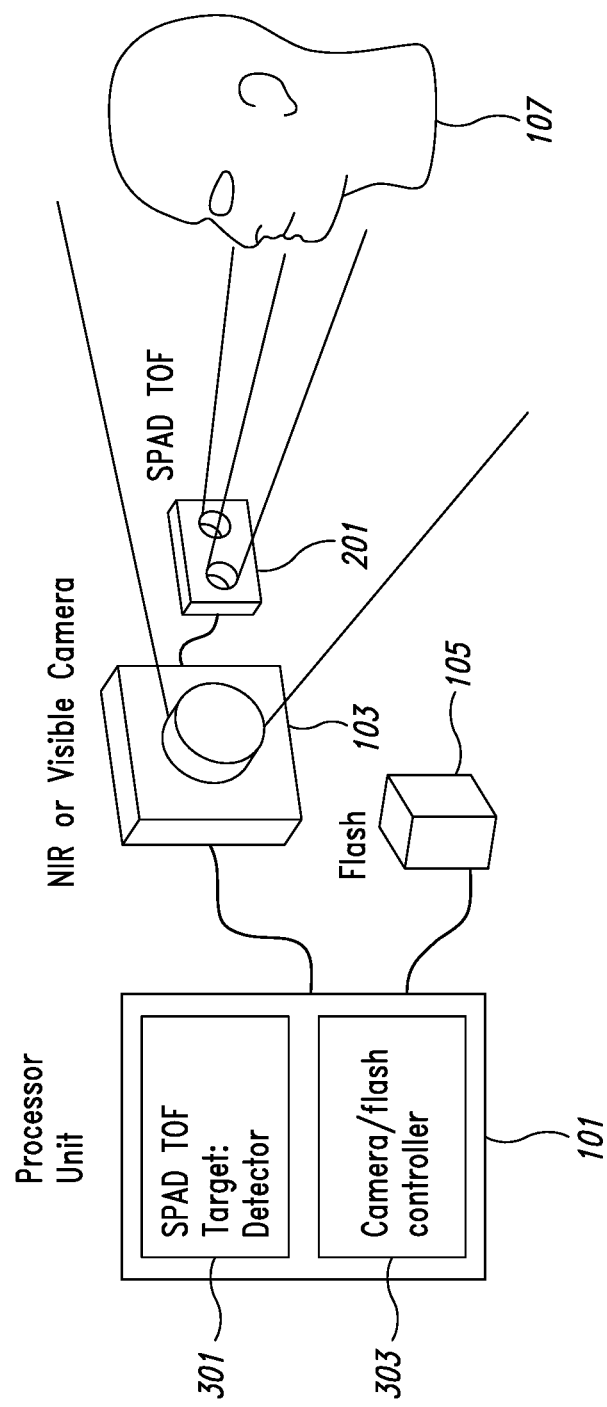
FIG. 3A shows a schematic view of the example security implementation apparatus shown in FIG. 2 in further detail using the SPAD as a presence device.

With respect to FIG. 3A an embodiment of the example apparatus shown in FIG. 2 is shown in further detail where the SPAD TOF module is used as a presence detector or presence sensing device to assist the operation of the system. In this example the SPAD TOF module 201 is a single zone SPAD TOF module where an illumination source such as a vertical cavity surface emitting laser (VCSEL) generates a single 'beam' which is configured to be reflected off the object. The reflected light photons are detected by an array of avalanche diodes and associated summation device and timing electronics which enables a time-of-flight determination to be made. From the time of flight determination a range between the sensor module and the object may be determined.

The example shown in FIG. 3A furthermore shows the processor unit comprising a SPAD TOF target detector circuit or module 301 and a camera/flash controller circuit or module 303. The SPAD TOF target detector 301 may be configured to receive the SPAD TOF output (which may comprise histogram or timing data) and determine whether or not an object is within a 'target range'. This determination of whether the object is within the target range may enable the camera to capture an image of the object.

The camera/flash controller 303 may thus control the operation of the camera/flash based on the SPAD TOF target detector 301 output.

Figure 3B:
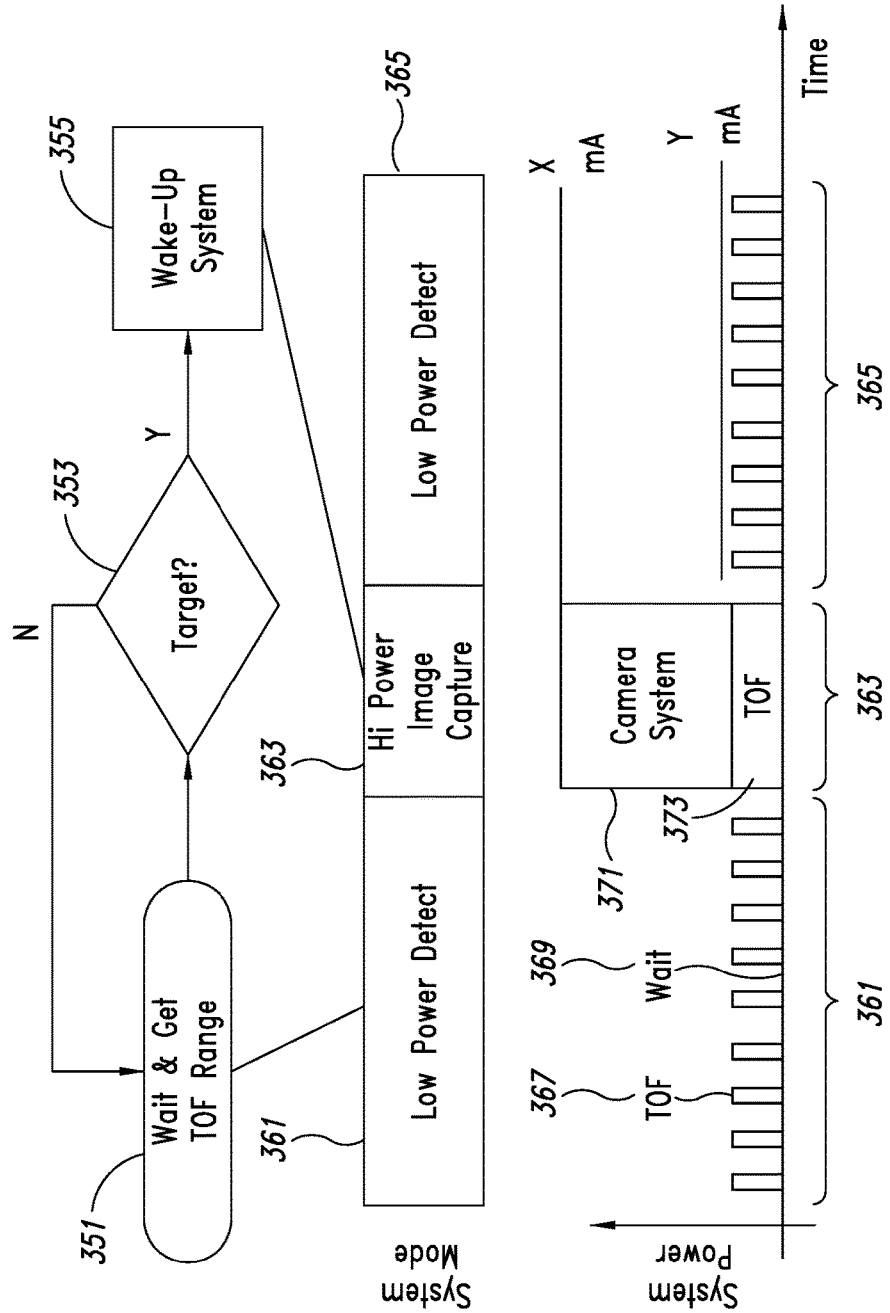
FIG. 3B shows a flow diagram of the operation of the example security implementation apparatus shown in FIG. 3A.

FIG. 3B for example shows an embodiment of a flow diagram of the operation of the apparatus shown in FIG. 3A. FIG. 3B furthermore shows example system modes of operation controlled by the operations shown and the system power consumption while operating in the modes.

The first operation shown is one where the system and the SPAD TOF module is in a low power detect mode of operation. In other words the SPAD TOF module is configured to wait for a time period, perform a range detection, and output the range detection values to the processor (and the SPAD TOF target detector 301).

The operation of performing a wait period, then get a time of flight range determination is shown in FIG. 3B by step 351.

The SPAD TOF target detector 301 may then attempt to determine whether a target has been detected. For example this may occur when a range value is within a defined range. Thus in some embodiments the target may be detected where the range is less than a proximity threshold or where the range is within a suitable image capture zone for the camera.

The operation of determining whether (or not) a target has been detected is shown in FIG. 3B by step 353.

Where the target is not detected then the operation may pass back to the wait and TOF range determination step. This is shown in FIG. 3B by the loop from the target detector step 353 to the step 351.

Where the target detector determines a target has been detected the SPAD TOF target detector 301 may be configured to 'wake up' the system by controlling the camera/flash controller 303 to cause the flash to illuminate the target and the camera to capture an image. After capturing the image the system may then process the image according to a known security determination operation. In some embodiments the system may be controlled to go back to a wait mode once the security operations are completed.

The operation of waking up the system is shown in FIG. 3B by step 355.

FIG. 3B as indicated above further shows an example time line showing the modes of operation of the system. The example shown in FIG. 3B shows the system initially in a low-power detect mode 361, where the SPAD is performing periodic range determinations and the processor determining whether the range determinations indicate a target has been detected. At the point where the system is woken up by step 355 the system is then operated in a high power image capture mode 363 for a time period where the camera and flash are activated, images are captured and the images are processed. Following this high power image capture mode 363 the system can then pass back to the low-power detect mode 365.

The difference in power consumption between the high power image capture mode and the low power detect modes is also shown in FIG. 3B by the system power graph. The graph shows the power consumption during the low power detect mode which comprises a first power consumption level (Y mA) for a sequence of time of flight range determination operations 367 which are separated by negligible power consumption within the wait periods 369. Furthermore the graph shows the high power image capture mode power consumption which comprises a second power consumption level (X mA>>Y mA) for time of flight range determination operations and camera system operations.

Figure 4:
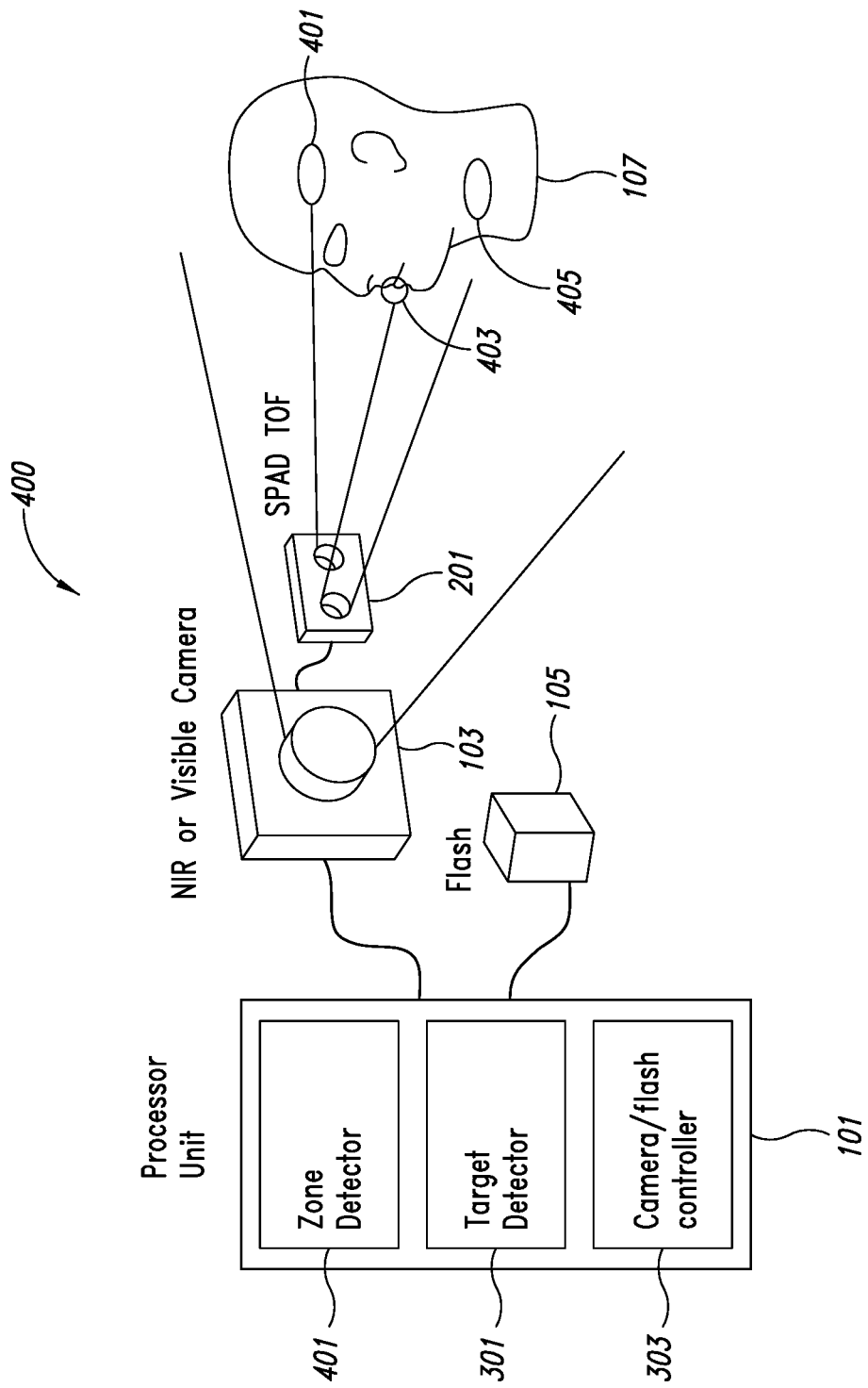
FIG. 4 shows a schematic view of the example security implementation apparatus shown in FIG. 2 in further detail using the SPAD as a multipoint presence device.

With respect to FIG. 4 a further example of a security system 400 comprising a SPAD TOF module or circuit according to some embodiments is shown. In this example the SPAD TOF module is used as a presence detector or presence sensing device to assist the operation of the system 400 and is configured or designed to operate in a multi-zone SPAD TOF mode. The multi-zone mode is one where an illumination source such as the vertical cavity surface emitting laser (VCSEL) generates more than one beam (for example, through lensing or by having multiple VCSEL elements). These multiple 'beams' are configured to be reflected off the object at different positions and may then be detected by the return array of avalanche diodes (which may be divided into sub-array parts configured to receive separate beams). In some embodiments the module which comprises the return array of avalanche diodes comprises a lensing arrangement configured to focus light reflected from different locations on different parts of the return array. In such a manner the SPAD TOF module is enabled to determine time-of-flight range determinations for more than one 'spot' or area of interest.

In the example shown in FIG. 4 the processor unit 101 and the zone detector 401 is configured to receive the multi-zone range data and perform a multi-zone verification operation before passing the result to the target detector 301. However it is understood that in some embodiments the verification operation (determining whether characteristics of the object are consistent with a true representation of an expected object) may be performed after a presence determination or in parallel with the presence determination operation. The zone detector 401 is configured to verify whether the results from the multi-zone range data indicate that the 'subject' or 'target' is an acceptable profile or shape.

The target detector 301 may be configured to operate in a manner similar to the target detector module 301 shown in FIG. 3A.

Thus the result of these zone detection and presence detection operations enable the camera and flash to be controlled not only when a target is within an acceptable range but also when the target is of an acceptable shape.

Figure 5A:
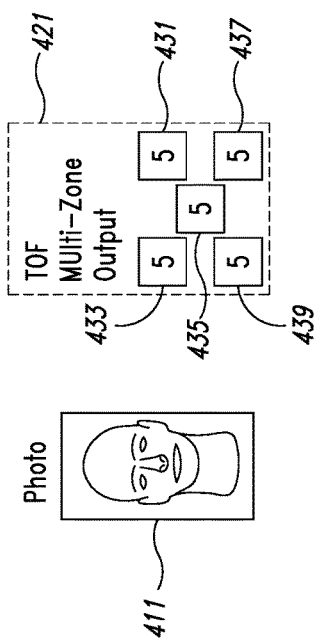
FIGS. 5A to 5C show multipoint presence determination examples for a photo image and human.
Figure 5B:
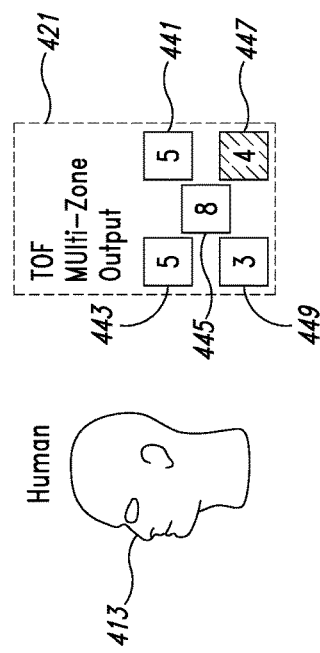
Figure 5C:
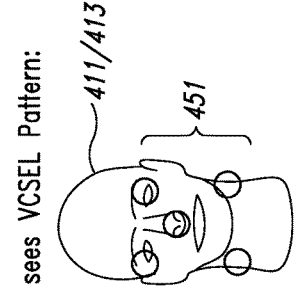

The (multi-)zone verification operation of an embodiment can be shown with respect to FIGS. 5A to 5C.

For example FIG. 5A shows an example multi-zone SPAD TOF output 421 based on the target being a photograph 411. The multi-zone SPAD TOF output 421 shows the range for the reflection spots 431, 433, 435, 437, and 439. As the target is flat the SPAD TOF outputs are similar or identical and all show an example range of 5.

FIG. 5B shows the example multi-zone SPAD TOF output 421 based on the target being a human face 413. The multi-zone SPAD TOF output 421 shows the range for the reflection spots 441, 443, 445, 447, and 449. As the target is curved the SPAD TOF outputs vary such that the center spot 445 is the closest (and range finding the nose) with a value of 8, the upper spots 441, 443 are further away (and range finding on the eyes) with a value of 5 and the lower spots 447, 449 (and range finding regions on the neck) are even further away with values of 4 and 3 respectively.

The zone detector 401 may be configured to look for specific differences in the outputs indicating an image shape which is to be identified. In some embodiments the zone detector is configured to detect specific shapes. For example the zone detector may be configured to detect whether a potential target object has too flat a profile (and likely to be spoof image) and generate an indication that there is no target to be captured. Thus with respect to the outputs shown in FIGS. 5A and 5B the zone detector 401 may be configured to generate an indicator or message to the camera controller 303 to capture an image of the target when detecting an output profile shown in FIG. 5B and/or to prevent an image of the target being captured by the camera when detecting an output profile shown in FIG. 5A.

In some embodiments the camera controller is configured to capture an image using the camera and verify that the VCSEL pattern is located on the target such as shown by the pattern 451 shown in the image of the target 411, 413 shown in FIG. 5C.

Figure 6A:
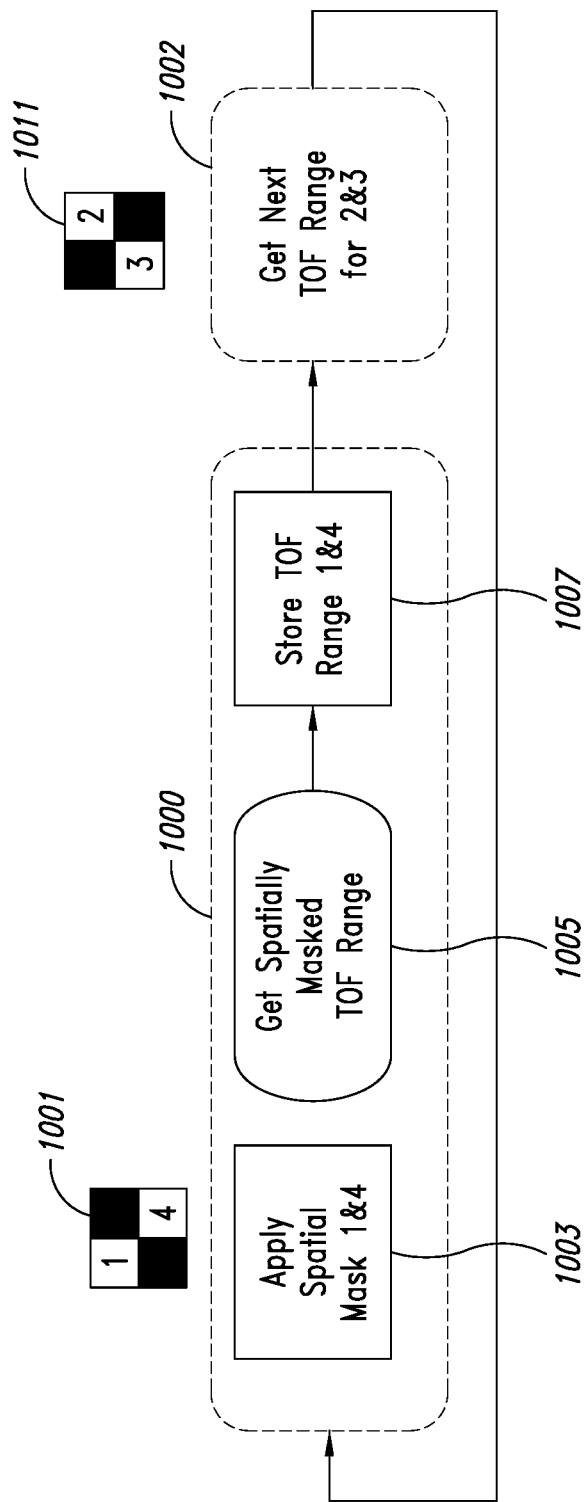
FIGS. 6A and 6B show example sequential and parallel multi-zone ranging methods.
Figure 6B:
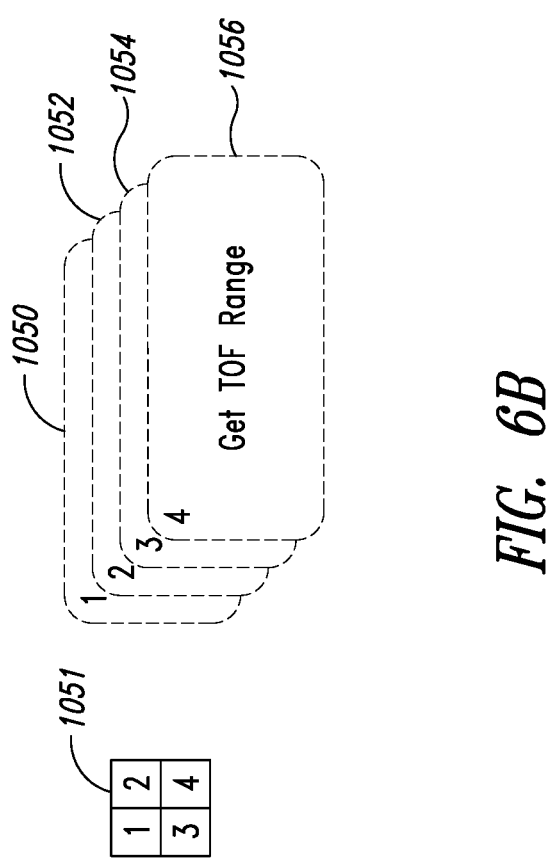

With respect to FIGS. 6A and 6B multi-zone range determination methods of an embodiment are shown in further detail.

For example FIG. 6A shows a sequential zone ranging operation. In this example the SPAD array is divided into four zones marked 1 to 4. The operation is divided into a first zone group determination 1000 where the zones 1 and 4 are used and a second zone group determination 1002 where the zones 2 and 3 are used.

The first zone group determination 1000 may be divided into an operation of applying a spatial mask to zones 1 and 4.

The operation of applying a spatial mask to zones 1 and 4 is shown in FIG. 6A by step 1003.

The spatially masked zones are then used to determine TOF ranges. The operation of getting the spatially masked TOF ranges is shown in FIG. 6A by step 1005.

The determined TOF ranges are then stored.

The operation of storing the determined TOF ranges is shown in FIG. 6A by step 1007.

The second zone group determination 1002 may be similarly divided into an operation of applying a spatial mask to zones 2 and 3, getting the spatially masked TOF ranges and storing the determined TOF ranges.

FIG. 6B shows a parallel zone ranging operation. In this example the SPAD array 1051 is divided into the same four zones marked 1 to 4 shown in FIG. 6A however the ranges from the time of flight determinations are performed in parallel or substantially in parallel as shown by the operation of getting the time of flight range for the zone 1 shown in step 1050, for zone 2 shown in step 1052, for zone 3 shown in step 1054, and for zone 4 shown in step 1056.

Figure 7:
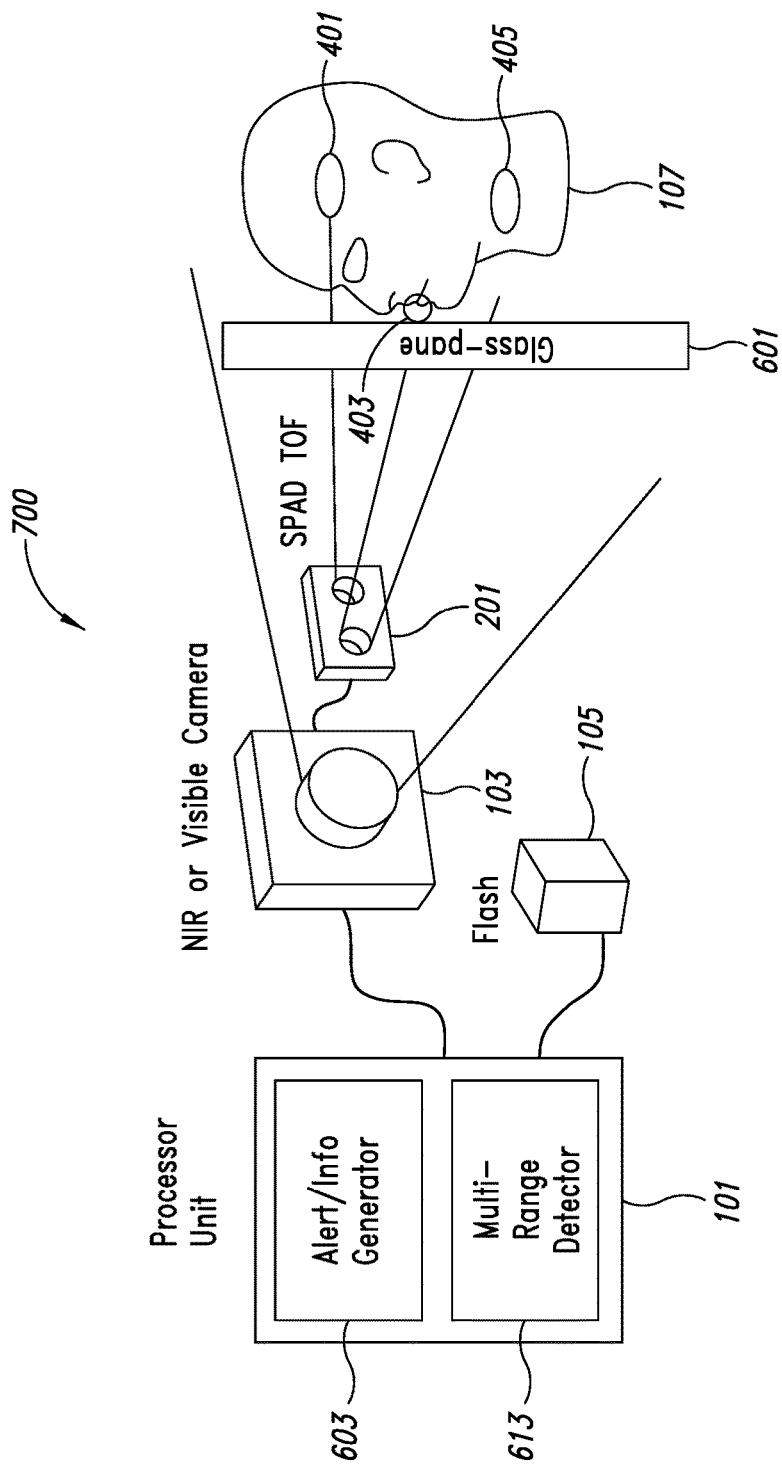
FIG. 7 shows a schematic view of the example security implementation apparatus shown in FIG. 2 in further detail using the SPAD as a multi-range presence device.

With respect to FIG. 7 a further example of a security system 700 comprising a SPAD TOF module according to some embodiments is shown. In this example the SPAD TOF module or circuit 201 is used as a presence detector or presence sensing device to assist the operation of the system and is configured or designed to operate in a multi-zone and multi-range SPAD TOF mode. The multi-range mode is one where each of the array or sub-array elements is able to return more than a range determination value.

As has been discussed previously security systems may have problems detecting targets where they are located behind a transparent surface (such as shown in FIG. 7 by the glass pane 601) which is located between the target 107 (with multi-zone spots 401 and 405 shown) and the camera 103, flash 105, processor 101 and SPAD TOF module 201. For example a glass door may be operated by the security system and it is required that the security device is located on the secure side of the door rather than being located on the insecure side. Another example is in iris recognition where a user wearing a pair of glasses may be detected and an alert generated to warn the user to remove or move their glasses to enable a more accurate determination to be performed. In such systems therefore it may be desired to capture an image of the target located on the other side of the glass pane or to provide information to alert the system that that there is a target on the other side of the transparent glass pane 601.

The example in FIG. 7 shows the processor comprising a multi-range detector 613 which operates in a manner similar to the zone and presence detectors described previously and may be configured to detect a potential target range and 'shape'. Furthermore the multi-range detector 613 is configured to detect where the SPAD TOF module or circuit is generating multiple ranges and provide this information to the alert/information generator 113.

Figure 8B:
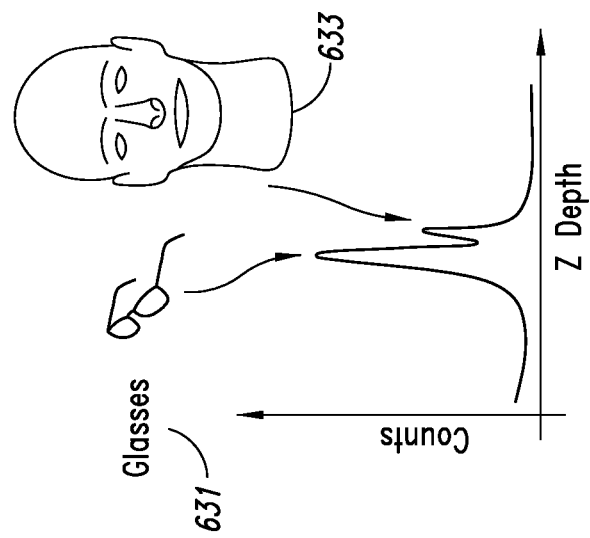
FIGS. 8A and 8B show multirange presence determination examples.
Figure 8A:
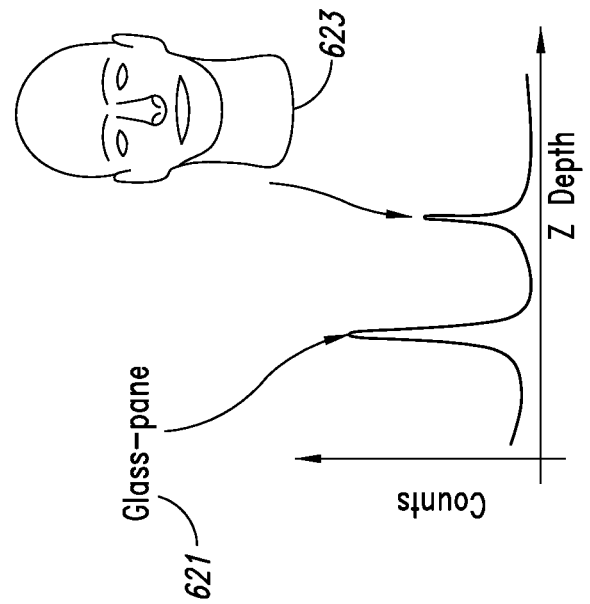

Example SPAD TOF module multi-range outputs, which may be generated by histogram methods of determining range, where example count against depth graphs are shown in FIGS. 8A and 8B. FIG. 8A shows the glass pane 601 example where the count output has a first peak 621 at a first depth associated with reflections from the glass pane 601 and a second peak 623 at a second depth associated with reflections from the target 107. FIG. 8B shows the pair of glasses worn by the user example where the count output has a first peak 631 at a first depth associated with reflections from the glasses and a second peak 633 at a second depth associated with reflections from the target 107. Using these outputs the multi-range detector can determine or extract multiple ranges.

The output of the multi-range detector 613 may be used to control an alert generator 603 and/or camera/flash controller (not shown in FIG. 7). For example the multi-range detector 613 on detecting a glass pane between the camera and the target (user) may control the focusing of the camera to the target behind the glass pane (for example by detecting using the multi-zone determination to detect a first flat zone pattern output and a second curved zone pattern output).

In some embodiments the multi-range detector 613 may be used to control an alert generator 603 to provide an alert (or information) message to the security system or to the user. For example in some embodiments the system may output a message to the user to remove their glasses in order that an iris recognition can be carried out or to alert the system that there is a target on the other side of the glass and to alert the user to move to a suitable viewing position where there is no glass.

Figure 9:
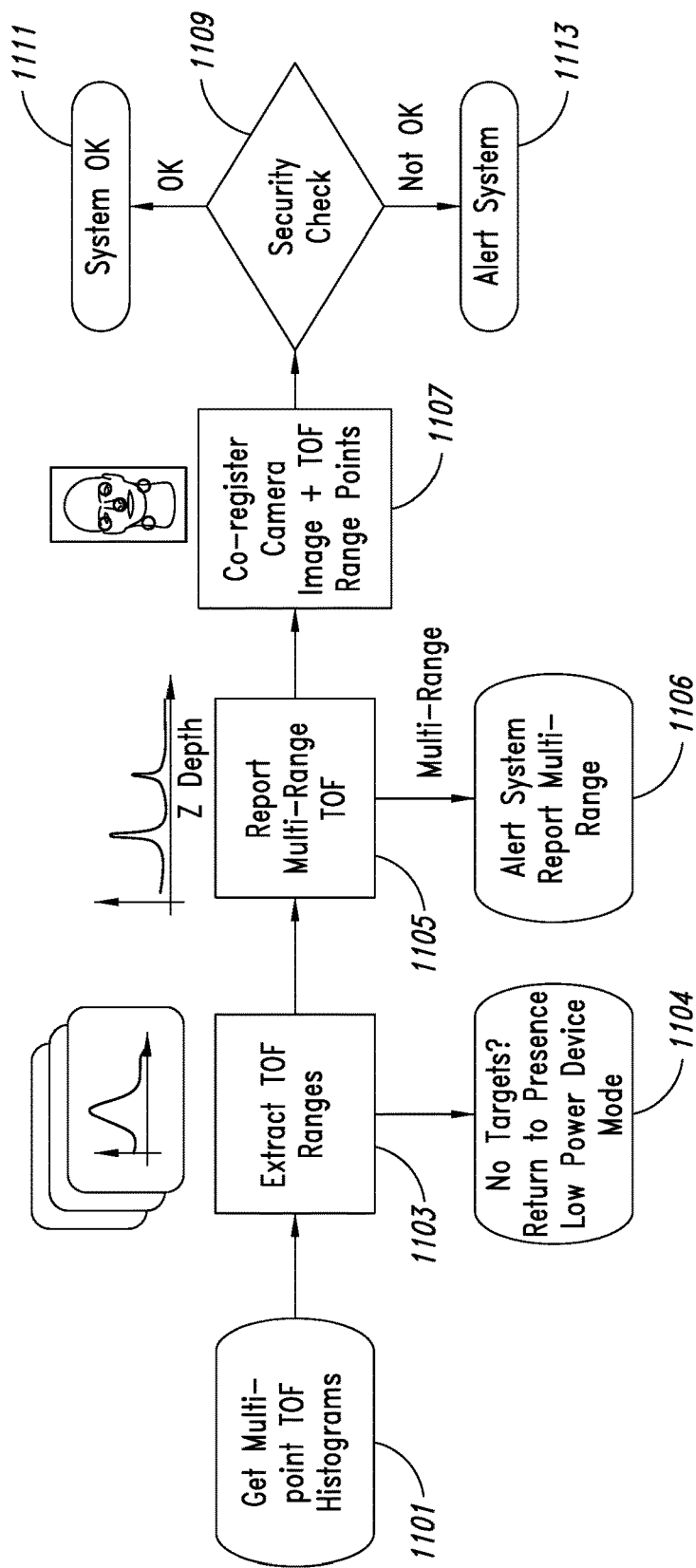
FIG. 9 shows an example flow diagram of the operation of the example security implementation apparatus shown in FIGS. 4 and 7.

With respect to FIG. 9 an example method for the security system such as shown in FIG. 7 is shown in further detail.

The first operation is one of getting the multi-zone or multi-point Time-of-flight histograms from the multi-zone/multi-range SPAD TOF module.

The retrieval or determination of multi-zone TOF histograms is shown in FIG. 9 by step 1101.

The next operation is then to extract from the histograms the TOF ranges.

The operation of extracting or determining the TOF ranges from the histograms is shown in FIG. 9 by step 1103.

In some embodiments if there are no ranges extracted or determined then the system returns to a low-power mode and a waits a defined time before attempting to generate another set of histograms.

The operation of detecting there are no targets and returning the device to a low power mode is shown in FIG. 9 by step 1104.

In some embodiments, where at least one range is extracted, the next operation is to determine whether there are multiple ranges within a single zone and therefore whether there is a potential glass pane/glasses issue.

The determination/reporting of multi-range TOF values is shown in FIG. 9 by step 1105.

In some embodiments where the multi-range TOF values are determined then the next operation is one of controlling an alert system to report the multi range situation. This, as described earlier, may generate a message to the user or control the system based on the application of the system.

The operation of alerting the system to report the multi-range situation is shown in FIG. 9 by step 1106.

Where the multi-range situation does not occur or where the multi-range situation is taken care of, for example to allow the selection of a target focus distance rather than the window focus distance, then the camera may capture an image. In some embodiments a co-registration of the camera image and the time of flight range points or spots may be performed. Thus for example the co-registration may be used to determine whether or not the image is of a correct target (for example a face) or a 'spoof' target (for example a print of the target).

The operation of co-registering the camera image and TOF range points is shown in FIG. 9 by step 1107.

The processor can then be configured to perform a security check. The security check can be any suitable check, for example a determination of whether the image matches the stored image on file.

The security check is shown in FIG. 9 by step 1109.

Where the security check is passed than a system okay message may be generated and passed to enable the security system to operate according to a known or defined rule set. For example the door may be opened. The system OK operation is shown in FIG. 9 by step 1111.

Where the security check is not passed then an alert system message may be generated and passed to enable the security system to be placed on alert mode.

The operation of generating an alert system message for the security system is shown in FIG. 9 by step 1113.

Figure 10:
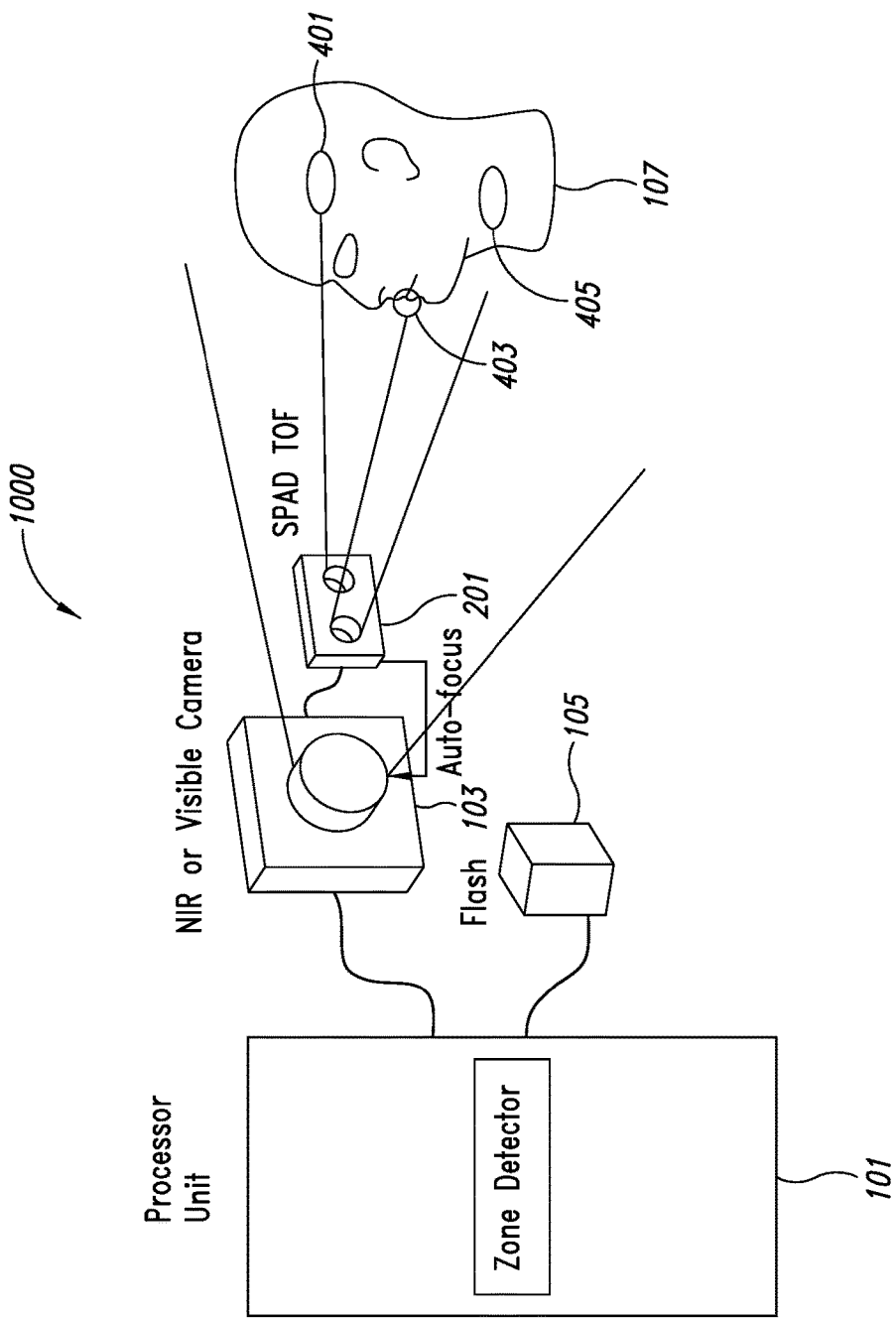
FIG. 10 shows a schematic view of the example security implementation apparatus shown in FIG. 2 in further detail using the SPAD as an auto-focus presence device.
Figure 11:
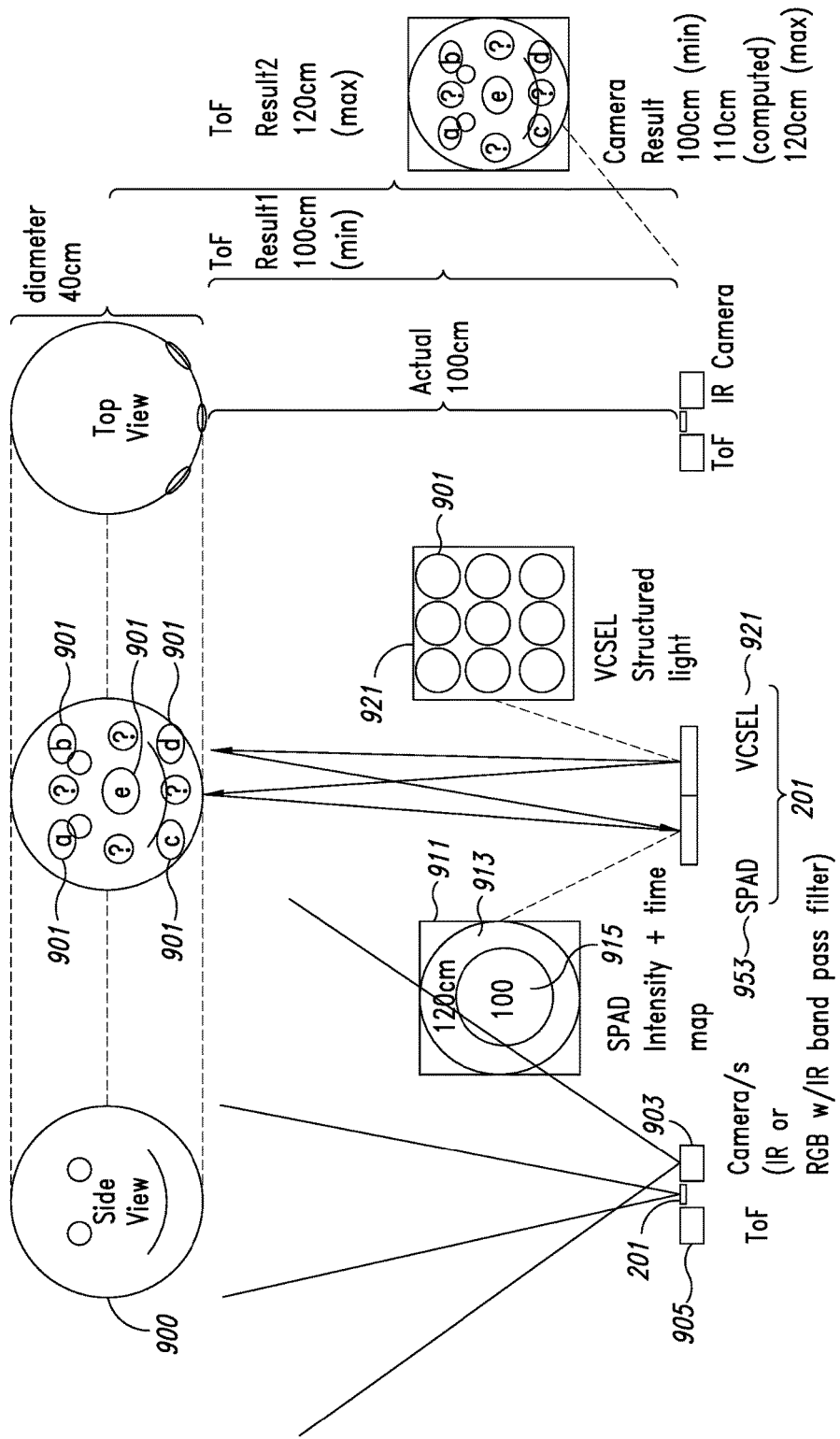
FIG. 11 shows a schematic view of the example object verification apparatus according to some embodiments.

FIG. 10 shows a further example of a security system 1000 similar to FIG. 2 and in this example the SPAD TOF module or circuit 201 is configured to generate and directly provide range information to the camera 103 in order that the camera is able to focus based on the range information generated by the SPAD TOF module or circuit 201. In some embodiments the SPAD TOF module 201 may be configured to pass this range information to the processor, which passes the range data to the camera. In such embodiments the processor may be configured to choose a focus point where there is more than one possible focus point (for example where it is required to focus on the eyes of the target). With respect to FIG. 11 an embodiment combining the information from a SPAD TOF module or circuit and cameras is shown. In this example the system is an object verification system. An object verification system may for example be used in an industrial process to assess whether a correct object is located at the correct location to be 'processed'. In other words to verify that the image captured by the camera is the image or object required. The example system in FIG. 11 shows an object 900 with a diameter 40 cm and located approximately 100 cm from the system. The system is shown with a stereo camera system comprising cameras 903 and 905 which are separated by a SPAD TOF module 201 between the cameras. Each camera 903, 905 may be, for example, an infrared or red-green-blue (RGB) with an infrared band pass filter camera.

As shown in the center of FIG. 11 the SPAD TOF module 201 comprises a VCSEL 921 which generates a structured light pattern 901 shown by the 3×3 array pattern. The SPAD TOF module 201 further comprises the SPAD array which is able to generate an intensity and time map 911. The intensity and time map 911 of the target object may show a first zone range of 100 cm (the minimum distance from the module to the target) and a second zone range of 120 cm (the maximum distance from the module to the target).

This profile map 911 can then be compared against computational camera distance determination. For example the processing of the stereo images may generate a computed stereo range of 110 cm (the average of the maximum and minimum TOF values).

Although the examples shown here in show co-operation of TOF data in a camera system with respect to a security or verification system it is understood that the combination of the SPAD TOF and camera modules can be used for other applications and implementations. For example co-operation between the TOF module and the camera may be used within augmented reality applications where the time of light sensor can provide focused distance and assist the augmented reality cameras.

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating photo-sensitive elements capable of receiving light intensity, time of arrival, frequency or phase or amplitude/intensity modulation, wavelength (color) or other information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
   time of flight single-photon avalanche diode (ToF SPAD) circuitry, which, in operation, generates multiple indications of distance between the apparatus and at least one object within a field of view of the apparatus, wherein the multiple indications of distance corresponding to respective regions within the field of view of the apparatus; and
   processing circuitry, which, in operation:
      controls at least one image sensor to capture at least one image based on at least one of the multiple indications of distance between the apparatus and the at least one object within the field of view of the apparatus; and
      determines whether the at least one image comprises a true representation of an expected object, the determining including:
         comparing the multiple indications of distance to an expected object distance profile; and
         comparing the at least one image to at least one expected object image, wherein the ToF SPAD circuitry, in operation, generates multiple indications of distance between the apparatus and the at least one object for a single region within the field of view, and the processing circuitry, in operation:
      determines whether a translucent or transparent object is between the at least one image sensor and the at least one object in the field of view of the apparatus; and
      controls an alert system based on the determining whether a translucent/transparent object is between the at least one image sensor and the at least one object in the field of view of the apparatus.

2. The apparatus as claimed in claim 1 wherein the processing circuitry, in operation:
   determines whether the at least one object is within a field of view of the at least one image sensor based on at least one of the multiple indications of distance; and
   controls the at least one image sensor to capture the at least one image based on the determination of whether the at least one object is within the field of view of the at least one image sensor, the at least one image comprising a representation of the object.

3. The apparatus as claimed in claim 2 wherein the processing circuitry, in operation, controls at least one illumination circuit based the determination of whether the at least one object is within the field of view of the at least one image sensor.

4. The apparatus as claimed in claim 1 wherein the processing circuitry, in operation:
   controls at least one security function based on the comparison of the at least one image to the at least one expected object image.

5. The apparatus as claimed in claim 1 wherein the ToF SPAD circuitry, in operation, provides at least one of the multiple indications of distance to the at least one image sensor to set a focal distance of the at least one image sensor.

6. The apparatus as claimed in claim 1 wherein,
   the at least one image sensor comprises at least two image sensors, the at least two image sensors having at least a partially overlapping field of view with a field of view of the ToF SPAD circuitry; and
   the processing circuitry, in operation:
      receives images from each of the at least two image sensors, the images comprising a representation of the object;
      determines at least one indication of distance between the at least two image sensors and the at least one object within the field of view of the apparatus based on the images from each of the image sensors and parameters of the at least two image sensors; and
      verifies the at least one indication of distance between the at least two image sensors and the at least one object based on at least one of the multiple indications of distance between the apparatus and the at least one object within the field of view of the apparatus.

7. The apparatus of claim 1 wherein the at least one image sensor comprises at least one camera.

8. A method, comprising:
   generating, using time of flight single-photon avalanche diode (ToF SPAD) circuitry, multiple indications of distance between the ToF SPAD circuitry and at least one object within a field of view of the ToF SPAD circuitry, the multiple indications of distance corresponding to respective regions within the field of view of the ToF SPAD circuitry;

controlling, using processing circuitry, at least one image sensor to capture at least one image based on at least one of the multiple indications of distance between the ToF SPAD circuitry and the at least one object within the field of view of the ToF SPAD circuitry; and determining, using the processing circuitry, whether the at least one image comprises a true representation of an expected object, the determining including:

comparing the multiple indications of distance to an expected object distance profile; and comparing the at least one image to at least one expected object image, wherein the method comprises:

generating, using the ToF SPAD circuitry, multiple indications of distance between the ToF SPAD circuitry and the at least one object for a single region within the field of view:

determining, using the processing circuitry, whether a translucent or transparent object is between the at least one image sensor and the at least one object in the field of view; and controlling an alert system based on the determining whether a translucent/transparent object is between the at least one image sensor and the at least one object in the field of view.

9. The method as claimed in claim 8, comprising:

determining by the processing circuitry, whether the at least one object is within a field of view of the at least one image sensor based on at least one of the multiple indications of distance; and controlling, by the processing circuitry, the at least one image sensor to capture the at least one image based on the determination of whether the at least one object is within the field of view of the at least one image sensor, the at least one image comprising a representation of the object.

10. The method as claimed in claim 9, comprising:

controlling, by the processing circuitry, at least one illumination circuit based the determination of whether the at least one object is within the field of view of the at least one image sensor.

11. The method as claimed in claim 8, comprising controlling at least one security function based on the comparison of the at least one image to the at least one expected object image.

12. The method of claim 8, comprising providing at least one of the multiple indications of distance to the at least one image sensor to set a focal distance of the at least one image sensor.

13. The method of claim 8 wherein the at least one image sensor comprises at least two image sensors, the at least two image sensors having at least a partially overlapping field of view with a field of view of the ToF SPAD circuitry, and the method comprises:

controlling, using the processing circuitry, the at least two image sensors to capture respective images comprising a representation of the at least one object;

determining, using the processor, at least one indication of distance between the at least two image sensors and the at least one object within the field of view based on the images from each of the at least two image sensors and parameters of the at least two image sensors; and verifying the at least one indication of distance between the at least two image sensors and the at least one object within the field of view based on at least one of the multiple indications of distance between the apparatus and the at least one object in the field of view of the apparatus.

14. The method of claim 8 wherein the at least one image sensor comprises at least one camera.

15. A system, comprising:

image sensing circuitry, which, in operation, captures images of objects;

time of flight single-photon avalanche diode (ToF SPAD) circuitry, which, in operation, generates indications of distance associated with objects within a field of view, the indications of distance corresponding to respective regions within the field of view; and processing circuitry, which, in operation:

controls capturing of images by the image sensing circuitry based on indications of distance associated with objects generated by the ToF SPAD circuitry; and determines whether an image comprises a true representation of an expected object, the determining including:

comparing multiple indications of distance associated with the object to an expected object distance profile; and comparing the image to at least one expected object image, wherein the ToF SPAD circuitry, in operation, generates multiple indications of distance associated with at least one object for a single region within the field of view, and the processing circuitry, in operation:

determines whether a translucent or transparent object is between the image sensing circuitry and the at least one object in the field of view; and controls an alert system based on the determining whether a translucent/transparent object is between the image sensing circuitry and the at least one object in the field of view.

16. The system of claim 15, comprising illumination circuitry, wherein the processing circuitry, in operation, controls the illumination circuitry based on indications of distance associated with objects generated by the ToF SPAD circuitry.

17. The system of claim 15, comprising an integrated circuit, the integrated circuit including at least the ToF SPAD circuitry and the image sensing circuitry.

18. The system of claim 17 wherein the image sensing circuitry comprises at least two image sensors, the at least two image sensors having at least a partially overlapping field of view with a field of view of the ToF SPAD circuitry.

19. The system of claim 15, comprising smart phone circuitry.

* * * * *

UNITED STATES PATENT AND TRADEMARK OFFICE
CERTIFICATE OF CORRECTION

PATENT NO. : 10,521,921 B2  
APPLICATION NO. : 15/476100  
DATED : December 31, 2019  
INVENTOR(S) : Xiaoyong Yang et al.

Page 1 of 1

It is certified that error appears in the above-identified patent and that said Letters Patent is hereby corrected as shown below:

In the Claims

<u>Column 17, Line 20 Claim 8:</u>
"of view:"
Should read:
--of view;--.

Signed and Sealed this
Second Day of June, 2020

Andrei Iancu
*Director of the United States Patent and Trademark Office*